United States Patent Office 3,441,490
Patented Apr. 29, 1969

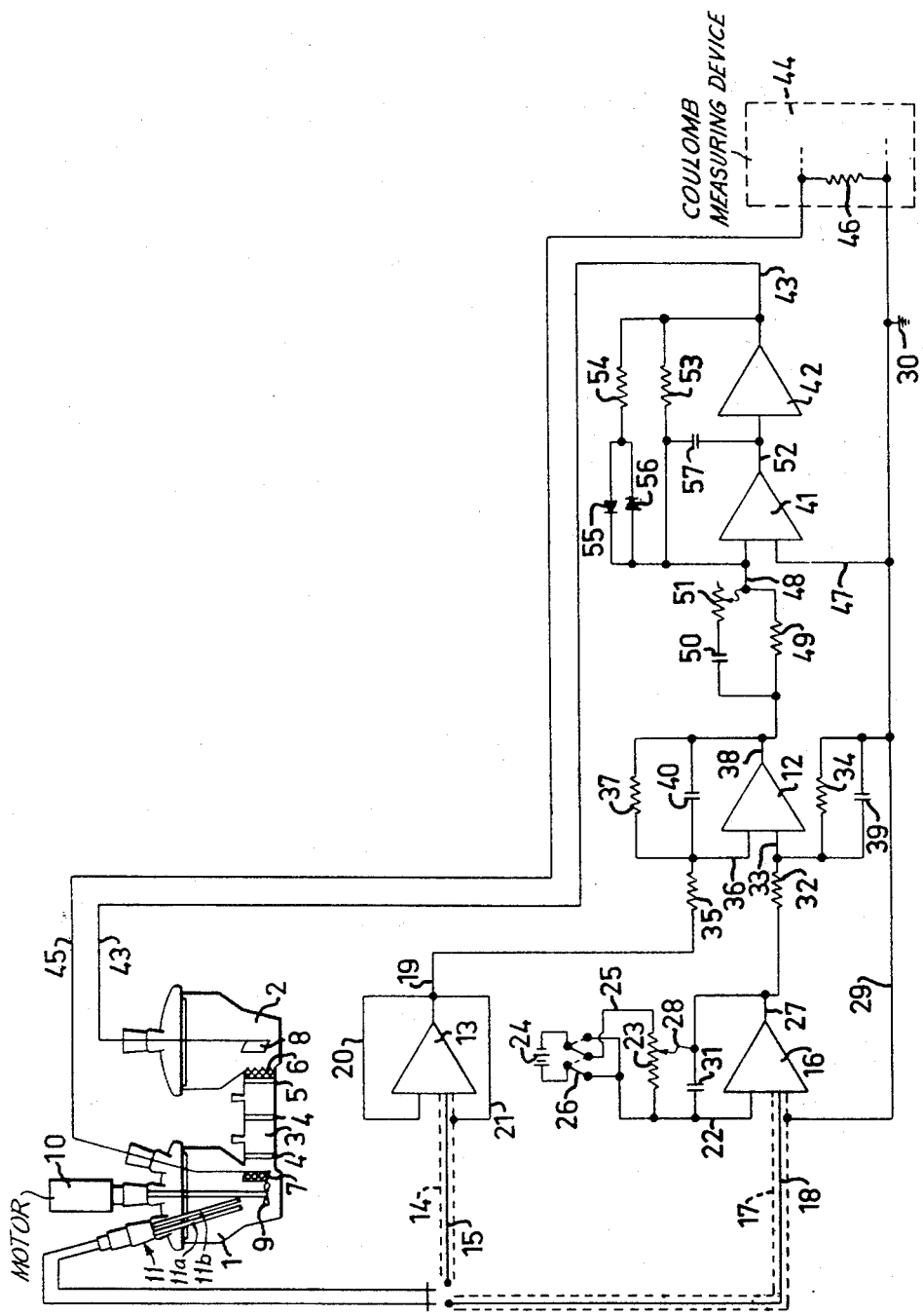

3,441,490
COULOMETRIC TITRATION APPARATUS
Gillis Rune Johansson, Lund, Sweden, assignor, by mesne assignments, to Jungner Instrument AB, Stockholm, Sweden, a Swedish joint-stock company
Filed Oct. 18, 1965, Ser. No. 496,936
Claims priority, application Sweden, Nov. 13, 1964, 13,681/64
Int. Cl. B01k *3/00;* G01r *11/34, 1/30*
U.S. Cl. 204—195        9 Claims

ABSTRACT OF THE DISCLOSURE

In a coulometric titration apparatus, having a titration electrode system and a Coulomb measuring device both fed by an electronic power amplifier, a measuring electrode and a reference electrode are connected to the two inputs of an electronic difference amplifier the output of which is connected to the input of the power amplifier.

---

This invention relates to a coulometric titration apparatus.

For the potentiometrical determination of the end point at a coulometric titration use is made of two pairs of electrodes, viz. a titration electrode system comprising a working electrode and an auxiliary electrode, and a measuring electrode system comprising an indicator electrode and a reference electrode and measuring for instance pH value, redox potential, metal ion concentration etc. The working electrode has another potential than the electrodes of the measuring electrode system. When both electrode systems are in simultaneous operation there occur several sources of error. Leakage currents and the like may give rise to erroneous measured values in the measuring electrode system and also to erroneous coulomb measured values. Besides, capacitance between the measuring electrode system and the titration electrode system may cause considerable lagging of the indication by means of the measuring electrode system since a change of the potential of one system in relation to that of the other system requires a current for charging or discharging the capacitance between the systems. When two systems operate at different reference voltages one system only can be connected to earth, and the other system will be subject to electrical interference from the environment, particularly where high impedance systems are concerned. Because of the said sources of error it has hitherto been deemed best to let the titration electrode system function alternately when very exact results were desired, but such alternate function is time-consuming and necessitates keeping a constant watch.

The present invention has for its object to permit performing extremely accurate titrations rapidly without any watching or switching between the electrode systems being necessary, and the apparatus suggested by the present invention is therefore well suited for performing purely automatic titrations. The invention thus relates to a coulometric titration apparatus which in an electrolytic titration apparatus has on one hand a titration electrode system comprising a working electrode and an auxiliary electrode, and on the other hand a measuring electrode system comprising a measuring electrode and a reference electrode, a supply circuit for supplying current to the titration electrode system being connected to a measuring appliance adapted to determine the number of coulombs consumed at the titration. The present invention is characterized by the fact that the measuring electrode and the reference electrode are connected each to one input channel of an electronic differential amplifier, that a voltage level changing means is connected to one input channel for adding (positively or negatively) to said input channel a voltage of a value corresponding to the desired voltage differential value between the measuring electrode and the reference electrode at the end point of the titration, and that the supply circuit is connected to the output of the differential amplifier.

The above and further features of the invention will become apparent from the following detailed description in which reference is made to the accompanying drawing which illustrates a wiring diagram for an apparatus according to the invention.

Referring to the drawing, this illustrates an electrolytic titration cell having two vessels 1 and 2 interconnected at the lower ends through a pipe which contains two porous sintered glass disks 4 and a glass filter disk 5 coated with a layer 6 of silica gel. Disposed in the vessel 1 is a working electrode 7 and in the vessel 2 an auxiliary electrode 8. These electrodes may be of any desired construction and material but may preferably consist of platinum wire mesh. An agitator 9 driven by a motor 10 is also mounted in the vessel 1. Further, the vessel 1 contains a pH measuring electrode system 11 comprising in conventional manner a measuring electrode and a reference electrode, schematically shown at 11a and 11b and consisting for instance of a glass electrode and a calomel electrode. The electrode system 11 and the working electrode 7 dip into the liquid to be titrated in the vessel 1 and the auxiliary electrode 8 dips into the same or another liquid in the vessel 2. The current path required for the electrolysis is erected between the electrodes 7 and 8 by the intermediary of the liquid or liquids through the layer 6 and the disks 4, 5.

The electrodes of the electrode system 11 are connected each to one input of an electronic difference amplifier 12. One electrode of the system 11, preferably the measuring electrode is thus connected to a follower amplifier 13 in one input channel of the difference amplifier 12 with the aid of a wire 15 provided with a screen 14, and the other electrode, preferably the reference electrode, is connected to a follower amplifier 16 in the other input channel of the difference amplifier with the aid of a wire 18 provided with a screen 17. The screens 14 and 17 must surround the wires 15 and 18 throughout their lengths although for greater clarity the screens have been shown in the drawing only around part of the wires 15 and 18. Screening of these wires is necessary because the pH measuring electrode system 11 has a very high resistance, and follower amplifiers with an effective amplification of almost precisely 1 have a very high input resistance so that without any screening the wires 15, 18 would pick up from the environment electric interference which would distort the values measured by the measuring electrode system 11. Though any type of follower amplifier with an effective amplification of almost precisely 1 could be used it has proved particularly advantageous to employ as follower amplifiers 13 and 16 a difference amplifying means one input of which is connected to the wires 15 and 18, respectively, and the other input of which is connected to the output of the difference amplifying means. The amplifier 13 may be for instance the difference amplifier sold by G. A. Philbrick Res., Inc., U.S.A.

under the designation "Model P2," and the amplifier 16 may be of the same kind or of the cheaper type "Model P65A" of the same company.

As for the follower amplifier 13 the output wire 19 thereof is directly connected by means of a wire 20 to that input of the amplifier 13 which is not connected to the wire 15. The output wire 19 besides is connected by means of a wire 21 to the screen 14 so that the latter accurately keeps at the same voltage as the wire 15. By the arrangement described the voltage in the output wire 19 will very accurately follow the voltage in the input wire 15 so that both wires 15 and 19 have the same voltage to ground (except the small difference arising because the effective amplification of the follower amplifier 13 must be insignificantly smaller than 1).

As for the follower amplifier 16 the input which is not connected with the wire 18 is connected through a wire 22 to one end of a potentiometer 23 and one pole of a voltage source 24 the other pole of which is connected to the other end of the potentiometer through a wire 25. A switch 26 between the voltage source 24 and the wires 22, 25 permits the desired pole changing of the connection of the voltage source to the two lines. The output wire 27 of the follower amplifier 16 is connected to the movable contact element 28 of the potentiometer 23. By operation of the movable contact element 28 of the potentiometer 23 and the switch 26 a desired voltage can thus be positively or negatively added to the feed-back loop between the output wire 27 and input wire 22 of the amplifier 16. This implies that the output wire 27 of the follower amplifier 16 will have to ground a voltage value differing from the voltage of the wire 18 to ground by a value corresponding to the voltage difference between the output wire 27 and the input wire 22. During titration the pH value of the solution in the vessel 1 changes and therefore the voltage difference between the measuring electrode and the reference electrode of the pH measuring electrode system will also change. The point is to titrate to a certain pH value and consequently to a certain voltage difference between the measuring electrode and the reference electrode. By so setting the switch 26 and the movable contact element of the potentiometer 28 that the voltage added to the feed-back loop of the follower amplifier 16 corresponds to the desired final voltage differential value between the measuring electrode and the reference electrode in the electrode system 11 at the end point of the titration it is thus possible to attain that at the end point of the titration the output wires 19 and 27 of the follower amplifiers 13 and 16 have the same voltage to ground although the measuring electrode and the reference electrode in the system 11 display a voltage difference corresponding to the pH value at the end point of the titration.

The screen 17 is connected to ground 30 via a wire 29. It should be observed specifically that the voltage source 24 must not be connected to ground, whereas the current supply devices for the follower amplifiers 13, 16, the difference amplifier 12, and a supply difference amplifying means described in the following can be connected to ground. A capacitor 31 which serves to smooth voltage variations upon operation of the movable contact element 28 of the potentiometer 23 is connected between the movable contact element of the potentiometer and the input wire 22 of the follower amplifier 16.

The output wire 27 of the follower amplifier 16 is connected by means of a series resistor 32 to one input wire 33 of the difference amplifier 12, and by means of a grounding resistor 34 said input wire 33 is connected to the ground connection 29. The resistor 32 may have for instance a resistance of 20 kilohms while the grounding resistor 34 has a relatively high resistance value, e.g. 1 megohm. The output wire 19 of the follower amplifier 13 is connected by means of a series resistor 35 to the second input wire 36 of the difference amplifier 12, said input wire 36 being also connected by means of a feed- back resistor 37 to the output wire 38 of the difference amplifier 12. Through the series resistor 35 and the feedback resistor 37 of the channel of the difference amplifier 12 connected to the input wire 36 is designed as an operational amplifier the effective amplifying gain of which is practically constant and has a value which is determined practically solely by the two resistors 35 and 37 and constitutes the resistance value of the resistor 37 divided by the resistance value of the resistor 35. In the embodiment selected the series resistor 35 has a resistance value of 20 kilohms and the feed-back resistor 37 has a value of 1 megohm so that the effective amplification gain is 50.

By ordinary suitable bias control in the amplifier 12 the voltage of the output wire 38 to ground is so adapted before the apparatus is put into use that it is 0 v. when the output wires 19 and 27 of the follower amplifiers have the same voltage to ground. This condition occurs when the titration has reached its end point, i.e. when the liquid in the vessel 1 has reached a pH value at which the voltage difference between the two electrodes of the pH measuring electrode system 11 agrees with the voltage added by means of the potentiometer 23 to the feed-backloop of the follower amplifier 16. Before the end point of the titration has been reached there is a voltage difference between the output voltages of the follower amplifiers 13 and 16 to ground, and this voltage difference occurs in a form amplified by the constant amplification gain of the difference amplifier 12 as a voltage in the output wire 38 of the difference amplifier 12, which voltage deviates from the ground voltage 0 v. In other words, the voltage of the output wire 38 to ground in positive or negative direction is a measure of a corresponding deviation of the pH value of the liquid in the vessel 1 from the pH value which shall prevail at the end point of the titration and which has been determined by setting of the potentiometer 23.

In the course of the titration there occurs, however, not only a variation of the voltage of one electrode in relation to the voltage of the other electrode in the pH measuring electrode system 11 but also a variation, common to both electrodes, of the voltage level of the electrodes in relation to ground. When current flows between the working electrode 7 and the auxiliary electrode 8 in the course of the titration the voltage in relation to ground changes in that region of the liquid in the vessel 1 where the pH measuring electrode system 11 is located. Besides, the electrodes in the pH measuring electrode system 11 change their voltages in relation to ground collectively by the action of interference from the enviroment; other causes of common voltage changes are also possible. The common variation of the voltage level to ground in the electrodes of the pH measuring electrode system 11 is of course reflected as corresponding variations of the voltage level to ground in the output wires 19 and 27 from the follower amplifiers 13 and 16, but should in the least possible degree be reflected as a variation of the voltage in relation to ground in the output wire 38 from the difference amplifier 12, which latter voltage shall correspond, in an amplified degree, only to the difference between the voltages of the wires 19 and 27. How much the output voltage of a difference amplifier is changed at a common change of the two input voltages is usually expressed in percent of the latter change. Prior-art amplifiers of high quality usually have a value below 1%. In the embodiment illustrated use is made, as a difference amplifier 12, of the difference amplifier sold by G. A. Philbrick Res., Inc., U.S.A. under the designation "Model P55," which suppresses common voltage changes in the inputs to less than 0.1%. This has proved sufficient in practice, but it is also possible to use the more expensive difference amplifier "Model P2" of the same company, which suppresses to less than 0.0001%. To reduce the effect of transient interference and noise, smoothing capacitors 39 and 40 are connected in parallel with the resistors 34 and 37, respectively. To reach the said percentages for suppression of common voltage changes the product of the impedances 37 and 40, divided by the resistance 35, has to be equal to the product of the impedances 34 and 39 divided by the resistance 32.

As will appear from the foregoing the output wire 38 of the difference amplifier 12 carries a voltage in relation to ground, which is proportional to the deviation of the pH value of the solution in the vessel 1 from the pH value set by the potentiometer 23 and prevailing at the end point of the titration. This voltage in the output wire 38 can thus be utilized for controlling a supply circuit for supplying current to the titration electrode system 7, 8 in such a way that current flow between the electrodes 7, 8 is interrupted when the voltage of the output wire 38 in relation to ground is 0 v. and as a consequence the end point of the titration has been reached. In the embodiment chosen by way of example the supply circuit comprises on one hand a supply difference amplifying device which is composed of a difference amplifier stage 41 and a power amplifier stage 42 and the output wire 43 of which is connected to the auxiliary electrode 8, and on the other hand a measuring appliance 44 designed to determine the number of coulombs consumed at the titration, said appliance being of any prior-art type and therefore indicated only in the form of a broken line rectangle in FIG. 1 and the inputs of the appliance being connected to, respectively, the ground connection 29 and a wire 45 leading to the working electrode 7. In the embodiment selected the measuring appliance 44 measures the number of coulombs consumed at the titration by time integration of the voltage drop, caused by the titration current flow, across a resistor 46 connected between the wires 29 and 45.

The amplifier stage 41 is a difference amplifier which may be of the same type as the amplifier 12. One input wire 47 of the difference amplifier 41 is connected to the ground connection 29. The other input wire 48 of the amplifier 41 is connected to the output wire 38 of the amplifier 12 via a fixed coupling resistor 49 and a network connected in parallel with the resistor 49 and comprising a capacitor 50 and a variable resistor 51 in series. The capacitor and resistor assembly 49–51 serves to dampen the hunting or oscillation which could be caused by lagging of the measured value of the pH measuring electrode system 11 behind the actual pH value of the liquid in the vessel 1. By setting of the variable resistor 51 the damping may be made critical so that hunting of oscillation is avoided or becomes insignificant. In the embodiment chosen by way of example the resistor 49 has a value of 10 kilohms, the variable resistor 51 a maximum value of 100 kilohms and the capacitor 50 a value of 2 μf.

The output wire 52 of the difference amplifier stage 41 is connected to the input of the power amplifier stage 42. The power amplifier stage 42 may be of any suitable type whatever which is capable of supplying a sufficiently strong current to the titration electrode system 7, 8 and which is capable of changing the voltage of the output wire 43 in such a way that the current flow between the electrodes 7, 8 of the titration electrode system may be reversed for realizing back titration when a reversible electrolyte system is titrated. By suitable bias control in a known manner in the supply difference amplifier device 41, 42 the voltage in wire 43 in relation to ground is adapted in such a way that no current flows between the titration electrodes 7, 8 when the output wire 38 of the difference amplifier 12 has the voltage 0 v. in relation to ground and as a consequence the end point of the titration has been reached.

The amplifying device 41, 42 is wired as an operational amplifier of the type having a constant amplification gain. Thus the output wire 43 of the amplifying device 41, 42 is connected to the input wire 48 of the amplifying device on one hand by means of a feed-back resistor 53 and on the other by means of a modifying circuit connected in parallel with the resistor 53 and comprising a modifying resistor 54 in series with two parallel-connected semiconductor diodes 55 and 56, the anode of one diode and the cathode of the other diode being connected with the resistor 54. The resistor 53 may have for instance a resistance of 500 kilohms, and the resistor 54 for instance a resistance of 100 kilohms. When the pH value measured by the pH measuring electrode system 11 differs considerably from the pH value desired at the end point of the titration so that the output wire 38 of the amplifier 12 has a voltage considerably differing from ground, either of the diodes 55, 56 is current-conductive in the forward direction so that the resistors 53, 54 are effectively connected in parallel. The effective amplification gain of the amplifying device 41, 42 then is relatively small, viz. substantially the combined resistance value of the parallel-connected resistors 53, 54 divided by the resistance value for the resistor 49. When on the other hand the pH value of the liquid in the vessel 1 differs very little from the desired pH value at the end point of the titration so that the output wire 38 of the amplifier 12 displays an insignificant voltage difference from ground, the voltage across the diodes 55, 56 is less than that required to drive any appreciable current through either diode in the forward direction, so that the resistor 54 is effectively disconnected from the feed-back loop between the wires 43, 48. Now the amplification gain of the amplifying device 41, 42 is high, viz. substantially the resistance value of the resistor 53 divided by the resistance value of the resistor 49. By reason of this feed-back device the total amplification gain is high near the end point of the titration, which is important for exactly establishing this point, while the amplification gain is lower at a greater distance from the end point of the titration, which is of importance to the damping of hunting or oscillation. If it is desired to increase the voltage range within which the amplification gain is high, beyond what can be attained by means of simple semi-conductor diodes 55, 56 use can be made, in lieu of each diode, of a diode series in which the diodes are so interconnected as to let current pass in the same direction.

To reduce the influence of interference and noise and to prevent self-oscillation a capacitor 57 is connected between the output wire 52 and the input wire 48 of the differential amplifier stage 41.

What I claim and desire to secure by Letters Patent is:

1. A coulometric titration apparatus, comprising an electrolytic titration cell, a working electrode and an auxiliary electrode in said cell forming a titration electrode system, a measuring electrode and a reference electrode in said cell forming a measuring electrode system, an electronic difference amplifier having two inputs and one output, a first input channel means connecting one of the inputs of said difference amplifier to said measuring electrode, second input channel means connecting the other input of said difference amplifier to said reference electrode, a voltage level changing means connected to one of said input channel means for adding thereto a voltage of a value corresponding to the desired voltage difference value between said measuring electrode and said reference electrode at the end point of the titration, an electronic supply circuit having an input and an output means for connecting the input of said supply circuit to the output of said difference amplifier, a coulomb measuring device, and means connecting the output of said supply circuit to said coulomb measuring device and said working and auxiliary electrodes for supplying current to said titration electrode system formed by said working electrode and said auxiliary electrode, and to said coulomb measuring device in dependence of the voltage difference between the two inputs of said difference amplifier.

2. A coulometric titration apparatus, comprising an electrolytic titration cell, a working electrode and an auxiliary electrode in said cell forming a titration electrode system, a measuring electrode and a reference electrode in said cell forming a measuring electrode system, an electronic difference amplifier having two inputs and one output, first input channel means connecting one of the inputs of said difference amplifier to said measuring electrode, second input channel means connecting the other input of said difference amplifier to said reference electrode, a voltage level changing means connected to one of said input channel means for adding thereto a voltage of a value corresponding to the desired voltage difference value between said measuring electrode and said reference electrode at the end point of the titration, an electronic power amplifier device having an input and an output, coupling resistor means connecting the input of said power amplifier device to the output of said difference amplifier, feed-back resistor means inter-connecting the input and the output of said power amplifier device, a coulomb measuring device, and means connecting the output of said power amplifier device to said coulomb measuring device and said working and auxiliary electrodes for supplying current to said titration electrode system formed by said working electrode and said auxiliary electrode and to said coulomb measuring device in dependence of the voltage difference between the two inputs of said difference amplifier.

3. A coulometric titration apparatus according to claim 2 further comprising a network connected in parallel with said coupling resistor means to the output of said difference amplifier and the input of said power amplifier device and comprising a capacitor and a variable resistor in series.

4. A coulometric titration apparatus comprising an electrolytic titration cell, a working electrode and an auxiliary electrode in said cell forming a titration electrode system, a measuring electrode and a reference electrode in said cell forming a measuring electrode system, an electronic difference amplifier having two inputs and one output, first input channel means connecting one of the inputs of said difference amplifier to said measuring electrode, second input channel means connecting the other input of said difference amplifier to said reference electrode, a voltage level changing means connected to one of said input channel means for adding thereto a voltage of a value corresponding to the desired voltage difference value between said measuring electrode and said reference electrode at the end point of the titration, an electronic power amplifier device having an input and an output, coupling resistor means connecting the input of said power amplifier device to the output of said difference amplifier, feed-back resistor means interconnecting the input and the output of said power amplifier device, a modifying circuit connected in parallel with said feed-back resistor means to the input and the output of said power amplifier device and comprising a modifying resistor in series with two parallel-connected circuit branches including semi-conductor diode means for making one branch conducting in a direction towards said modifying resistor only and making the other branch conducting in a direction from said modifying resistor only, a coulomb measuring device, and means connecting the output of said power amplifier device to said coulomb measuring device and said working and auxiliary electrodes for supplying current to said titration electrode system formed by said working electrode and said auxiliary electrode, and to said coulomb measuring device in dependence of the voltage difference between the two inputs of said difference amplifier.

5. A coulometric titration apparatus, comprising an electrolytic titration cell, a working electrode and an auxiliary electrode in said cell forming a titration electrode system, a measuring electrode and a reference electrode in said cell forming a measuring electrode system, an electronic difference amplifier having two inputs and one output, first input channel means connecting one of the inputs of said difference amplifier to said measuring electrode, second input channel means connecting the other input of said difference amplifier to said reference electrode, a first electronic follower amplifier forming part of said first input channel means and having an input connected to said measuring electrode, a second electronic follower amplifier forming part of said second input channel means and having an input connected to said reference electrode, a voltage level changing means connected to one of said input channel means for adding thereto a voltage of a value corresponding to the desired voltage difference value between said measuring electrode and said reference electrode at the end point of the titration, an electronic supply circuit having an input and an output, means for connecting the input of said supply circuit to the output of said difference amplifier, a coulomb measuring device, and means connecting the output of said supply circuit to said coulomb measuring device and said working and auxiliary electrodes for supplying current to said titration electrode system formed by said working electrode and said auxiliary electrode, and to said coulomb measuring device in dependence of the voltage difference between the two inputs of said difference amplifier.

6. A coulometric titration apparatus according to claim 5, in which said first follower amplifier is a difference amplifier device having two inputs and one output, one input of said difference amplifier device being connected to said measuring electrode and the other input of said difference amplifier device being connected to the output of said difference amplifier device.

7. A coulometric titration apparatus according to claim 5, in which said second follower amplifier is a difference amplifier device having two inputs and one output, one input of said difference amplifier device being connected to said reference electrode and the other input of said difference amplifier device being connected to the output of said difference amplifier device.

8. A coulometric titration apparatus according to claim 5, comprising a potentiometer and a voltage source, the terminals of said voltage source being connected to the ends of said potentiometer and one of said first and second follower amplifiers being a difference amplifier device having two inputs and one output, one input of said difference amplifier device being connected to one of said measuring and reference electrodes and the other input and the output of said difference amplifier device being connected to one end of said potentiometer and the movable contact element of said potentiometer, respectively.

9. A coulometric titration apparatus, comprising an electrolytic titration cell, a working electrode and an auxiliary electrode in said cell forming a titration electrode system, a measuring electrode and a reference electrode in said cell forming a measuring electrode system, an electronic difference amplifier having two inputs and one output, first input channel means connecting one of the inputs of said difference amplifier to said measuring electrode, second input channel means connecting the other input of said difference amplifier to said reference electrode, an electronic follower amplifier forming part of one of said first and second input channel means and having an input and an output, the input of said follower amplifier being connected to one of said measuring and reference electrodes, resistor means connecting the output of said follower amplifier to one of the inputs of said difference amplifier, feed-back resistor means interconnecting the output of said difference amplifier and that input of said difference amplifier which is connected to said resistor means, a voltage level changing means connected to one of said input channel means for adding thereto a voltage of a value corresponding to the desired voltage difference value between said measuring electrode and said reference electrode at the end point of the titration, and electronic supply circuit having an input and an output, means for connecting the input of said supply circuit to the output of said difference amplifier, a coulomb measuring device, and means connecting the output of said supply circuit to said coulomb measuring device and said working and auxiliary electrodes for supplying current to said titration electrode system formed by said working electrode and said auxiliary electrode, and to said coulomb measuring device in dependence of the voltage difference between the two inputs of said difference amplifier.

References Cited

UNITED STATES PATENTS

| 2,745,804 | 5/1956 | Shaffer | 324—30 X |
|---|---|---|---|
| 3,032,493 | 5/1962 | Coulson et al. | 204—195 |

RUDOLPH V. ROLINEC, *Primary Examiner.*

CHARLES F. ROBERTS, *Assistant Examiner.*

U.S. Cl. X.R.

324—30, 123